US012810839B2

(12) United States Patent
Comin et al.

(10) Patent No.: US 12,810,839 B2
(45) Date of Patent: Nov. 24, 2026

(54) METHOD FOR ASSISTING A WORKER IN A PRODUCTION LINE, DATA PROCESSING APPARATUS AND COMPUTER PROGRAM

(71) Applicant: Airbus SAS, Blagnac (FR)

(72) Inventors: Alberto Comin, Blagnac (FR); Nunzio Sciammetta, Blagnac (FR)

(73) Assignee: Airbus SAS, Blagnac (FR)

( * ) Notice: Subject to any disclaimer, the term of this patent is extended or adjusted under 35 U.S.C. 154(b) by 140 days.

(21) Appl. No.: 18/680,744

(22) Filed: May 31, 2024

(65) Prior Publication Data

US 2024/0404508 A1 Dec. 5, 2024

(30) Foreign Application Priority Data

Jun. 1, 2023 (EP) .................................... 23176790

(51) Int. Cl.

| | |
|---|---|
| ***G10L 21/00*** | (2013.01) |
| ***G05B 23/02*** | (2006.01) |
| ***G10L 13/08*** | (2013.01) |
| ***G10L 15/16*** | (2006.01) |
| ***G10L 15/22*** | (2006.01) |
| ***G10L 25/00*** | (2013.01) |
| ***G10L 25/63*** | (2013.01) |

(52) U.S. Cl.
CPC ............ *G10L 13/08* (2013.01); *G05B 23/027* (2013.01); *G10L 15/16* (2013.01); *G10L 15/22* (2013.01); *G10L 25/63* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 10,770,059 | B2 * | 9/2020 | Scodary | G06N 3/091 |
| 11,797,769 | B1 * | 10/2023 | Gangadharaiah | G06F 40/284 |
| 2018/0276569 | A1 | 9/2018 | Oguri | |

(Continued)

FOREIGN PATENT DOCUMENTS

| | | | |
|---|---|---|---|
| CN | 106325494 | B | 1/2019 |
| KR | 20220097299 | A | 7/2022 |

OTHER PUBLICATIONS

European Search Report for corresponding European Patent Application No. 23176790.6 dated Nov. 22, 2023.

(Continued)

*Primary Examiner* — Satwant K Singh
(74) *Attorney, Agent, or Firm* — Greer, Burns & Crain, Ltd.

(57) ABSTRACT

A method for assisting a worker in a production line by: receiving a vocal input message from the worker; converting the vocal input message into a text input message; processing the text input message using a neural network to identify the content of the text input message and extract a request about at least one item related to the production line, wherein the neural network is configured as a large language model, LLM, and trained with information about the items of the production line; generating a response message containing information about the item of the production line using the neural network; converting the response message into a vocal response message; and providing the vocal response message to the worker.

14 Claims, 4 Drawing Sheets

(56) References Cited

U.S. PATENT DOCUMENTS

| | | | | |
|---|---|---|---|---|
| 2020/0118544 | A1* | 4/2020 | Lee | G10L 15/005 |
| 2021/0082412 | A1* | 3/2021 | Kennewick | G10L 13/08 |
| 2023/0021529 | A1* | 1/2023 | Bhattacherjee | G06F 16/33295 |
| 2023/0335277 | A1* | 10/2023 | Konidena | G06T 1/0014 |

OTHER PUBLICATIONS

B. Schuller et al., "Speech Communication and Multimodal Interfaces" Advanced Man Machine Interaction: Fundamentals and Implementation, Berlin, Jan. 1, 2006; pp. 141-190.

J. Jung-Sing et al., "Smart Technology-Driven Aspects for Human-in-the-Loop Smart Manufacturing" The International Journal of Advanced Manufacturing Technology, London, Apr. 2, 2021; pp. 1741-1752.

G. Yenduri et al., "Generative Pre-Trained Transformer: A Comprehensive Review on Enabling Technologies, Potential Applications, Emerging Challenges, and Future Directions" arxiv.org, Cornell University Library, Ithaca, NY, May 11, 2023.

S. Zhao et al., "Emotion Recognition from Multiple Modalities: Fundamentals and Methodologies" arxiv.org, Cornell University Library, Ithaca, NY, Aug. 18, 2021.

* cited by examiner

METHOD FOR ASSISTING A WORKER IN A PRODUCTION LINE, DATA PROCESSING APPARATUS AND COMPUTER PROGRAM

CROSS-REFERENCES TO RELATED APPLICATIONS

This application claims the benefit of European Patent Application Number 23176790.6 filed on Jun. 1, 2023, the entire disclosure of which is incorporated herein by way of reference.

FIELD OF THE INVENTION

The invention relates to a method for assisting a worker in a production line. The invention is furthermore concerned with a corresponding data processing apparatus and computer program.

BACKGROUND OF THE INVENTION

In the production processes and operations of a Final Assembly Line, FAL, there is constantly a need on enhancing and improving worker operations in the production line. A worker may require information during the operation on the production line, which is not available at that moment and may not be instantaneously accessible to the worker. This is because the requested information is located in manuals or databases which need an additional search step for the worker to access.

In particular, production processes and FAL operations in the aeronautical environment include processes such as the assembly of parts, cabling, etc., which are performed mostly by manual operation. This applies specifically to production lines of military aircrafts. Parts, screws, drilling machines, etc. are manually installed or operated. This leads to a need for storage of these tools, knowledge for the worker in the production line of where these are located, and how to properly use and operate them.

SUMMARY OF THE INVENTION

The problem of the invention is thus to improve access to information related to the production line.

According to the invention, this problem may be solved in each case by one or more embodiments described herein.

According to a first aspect of the invention, a method for assisting a worker in a production line is provided. The method comprises receiving a vocal input message from the worker, converting the vocal input message into a text input message, processing the text input message using a neural network to identify the content of the text input message and extract a request about at least one item related to the production line, wherein the neural network is configured as a large language model, LLM, and trained with information about the items of the production line, generating a response message containing information about the item of the production line using the neural network, converting the response message into a vocal response message; and providing the vocal response message to the worker.

According to a second aspect of the invention, a data processing apparatus is provided. The data processing apparatus comprises an input device, a data storage, and a processor configured to perform the method according to any of the preceding claims.

According to a third aspect of the invention, a computer program is provided. The computer program comprises instructions, which, when the program is executed by a computer, cause the computer to carry out the inventive method.

A fundamental concept of the invention is to apply natural language processing to receive and convert a prompt or request of the worker in a production line as an input message. A large language model comprising a neural network trained in natural language processing is found suitable for this task. In order to provide a helpful response, the neural network is further trained with information about the production line. In this way, the neural network is able to provide a response to the worker. A suitable response message is then formulated by summarizing all relevant pieces of information using the neural network and provided as a vocal message to the user.

With the vocal input message, the worker thus expresses a request about at least one item of the production line. A request may relate to an actual position of the item, a characteristic of the item, a correct handling of the item, or the like. The data processing apparatus including the processor, which is able to perform the inventive method, includes natural language processing to understand the request. The neural network architecture and related information are stored in a data storage of the data processing apparatus. The data apparatus is thus configured as a production line assistant for the worker. The worker can speak into the input device, which can be a microphone, and the response message is provided through e.g., a speaker. Both can be integrated into a headset, which the user is wearing.

A particular advantage in the solution according to an aspect of the invention is that the present invention reduces downtime of the production line. Instead of a search query based on keywords, which typically leads to an output of several pages of partially relevant content, a response message including a compact piece of relevant and timely information is provided. In case of a shortage of items required in the production line, corrective action can be taken instantaneously. The production line assistant recognizes that a particular item, such as a screw, is almost finished. The production line assistant can be trained to the behavior of the worker. The production line assistant is further trained to provide a warning as soon the shortage situation because evident.

The production line can be a final assembly line, FAL, which is used to assemble a product from parts of the product in a production process. This invention is particularly directed to production lines, which are not completely automated and workers are interacting manually in the production process. Such FALs are used to assemble products related to various fields of the industry, such as automotive, aircrafts, etc. Furthermore, the provided response message is received by the worker and its content is transferred to the work at the production lines. In this way, by improving the efficiency of the worker, the output of the production line can be increased.

Advantageous embodiments and further developments emerge from the description with reference to the figures.

According to some aspects of the method according to the invention, the item comprises at least one of a tool, an assembling part, a component of a product the production line is assembling, a production robot and a characteristic of the assembling line. In this way, the item may include all relevant means for assembling the product, including tools and machines, thus covering a large part of the possible requests of the worker.

According to some further aspects of the method according to the invention, the method further comprises accessing and searching a database based on the extracted item to determine information related to the item, wherein the information includes at least a characteristic of the at least one item. In this way, more information can be considered in the response message, thereby increasing the accuracy of the response with respect to the request of the worker.

According to some further aspects of the method according to the invention, the database includes a plurality of information sources, which includes at least one of at least one manual about an item of the production line, an inventory and a live status of the production line, wherein the live status includes a current position of the items related to the production line. In case, a specific tool is not available because it is used by another worker in that specific moment, the method can support the worker to obtain the tool. A colleague who is looking for the same tool can also be provided by real time information about the production line status.

According to some further aspects of the method according to the invention, generating the response message comprises summarizing a plurality of information found in the database. In this way, the response message can be filled with information that can be directly understood by the worker and transferred to the work at the production line.

According to some further aspects of the method according to the invention, the neural network is configured as a Generative Pretrained Transformer GPT or a generative artificial intelligence. These models represent a suitable set for addressing the technical problem. These models can also be fine-tuned in automation technology for more accuracy of the responses.

According to some further aspects of the method according to the invention, the method further comprises extracting implicit content from the text input message using the neural network, and supplying the implicit content to the content of the text input message before extracting a request about at least one item related to the production line. In this way, the method provides a means for setting the content of the text input message into a correct context. In this step, the neural network may already include accessing the database for collecting additional information as for example a production step the worker is about to start. In this way, the requirement for the worker to formulate a valid request is relieved.

According to some further aspects of the method according to the invention, the method further comprises: receiving a confirmation message from the worker based on the vocal response, evaluating the confirmation message for a level of required modification of the response message, and, if the level of required modification exceeds a predetermined value, accessing and searching the database based on the confirmation message to determine further information related to the at least one item. The confirmation message thus represents feedback on whether the response has correctly addressed the request of the worker. In this way, the method becomes more robust.

According to some further aspects of the method according to the invention, the method further comprises: retrieving environmental data of the production line to determine a current situation, and accessing and searching the database based on the extracted item to determine information related to the item based on the retrieved environmental data. In this way, the request of the worker can be set in the correct context with regard to the production line. This leads to a more accurate search and response to the request of the worker.

According to some aspects of the method according to the invention, the method further comprises processing the environmental data by accessing the database to determine a risk level of the current situation. In this way, the safety of the worker can be improved.

According to some aspects of the method according to the invention, the method further comprises adding an alert message to the response message, if the risk level is above a predetermined value. In this way, attention is drawn to the worker in case of danger. This step as well improves the safety of the worker.

According to some aspects of the method according to the invention, the method further comprises sending a message to an assistant terminal, if the risk level is above a predetermined value. In addition, the neural network preferably is configured to send an alert message independent of the request from the worker, in case the risk is high enough, i.e., in case the risk level is above e.g., the predetermined value. In this way, an external assistant can be called to support the worker with his request.

According to some aspects of the method according to the invention, retrieving the environmental data includes accessing wearables of the worker, in particular at least one of a headset and smart glasses of the worker. In this way, the method becomes more versatile by also being able to access various auxiliary items, such as e.g., user wearables a headset or a smart glasses of the user. Images of surveillance cameras or a computer controlling the whole or part of the production line may also be accessed for obtaining the environmental data.

According to some aspects of the method according to the invention, the method further comprises analyzing the vocal input message for determining a stress level of the worker using the neural network, wherein generating the response message is performed based on the determined stress level of the worker. With this "sentimental analysis", the response message can be set into a suitable "sentimental" context. For example, the response message may be formulated short by the neural network in case of a high stress level, because it is hard at for the worker to concentrate on a longer response message in this state. In case of low stress, in which the worker can concentrate longer on the response message, it may provide more detailed information.

The above embodiments and further developments can be combined with each other as desired, if useful. In particular, all features of the method for assisting a worker in a production line are transferable to the data processing apparatus and/or the computer program, and vice versa. Further possible embodiments, further developments and implementations of the invention also comprise combinations, not explicitly mentioned, of features of the invention described before or below with respect to the embodiments. In particular, the skilled person will thereby also add individual aspects as improvements or additions to the respective basic form of the present invention.

BRIEF DESCRIPTION OF THE DRAWINGS

The present invention is explained more specifically below on the basis of the exemplary embodiments indicated in the schematic figures, in which.

DETAILED DESCRIPTION OF THE PREFERRED EMBODIMENTS

Figure 1:
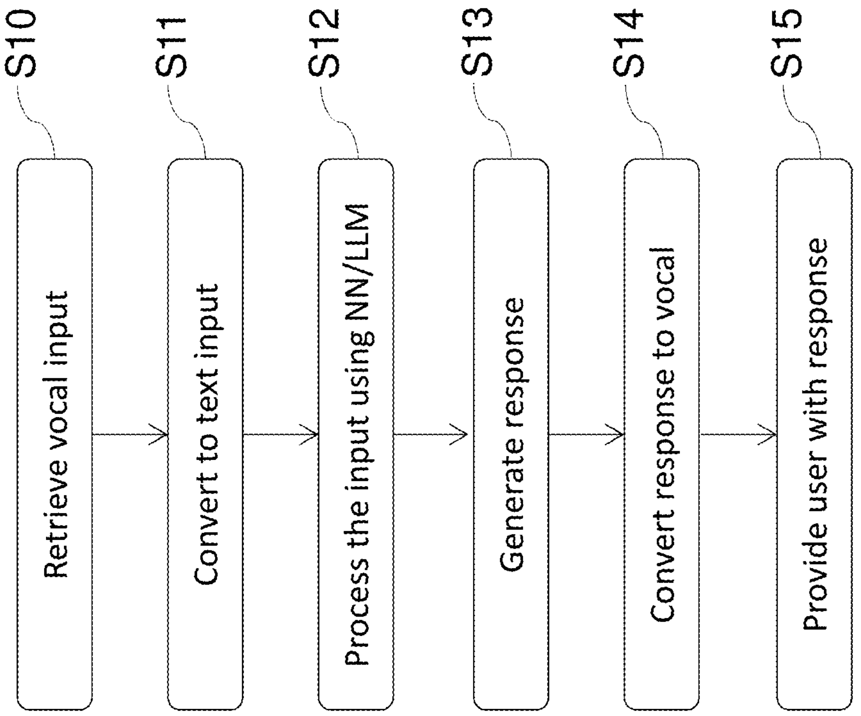
FIG. 1 shows a flow diagram of a method for assisting a worker in a production line according to an embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs-unless explained otherwise.

FIG. 1 shows a flow diagram of a method for assisting a worker in a production line according to an embodiment of the invention.

The method for assisting a worker in a production line shown in FIG. 1 comprises:

At first, a vocal input message is received S10 from the worker. The message may be a prompt of the worker during Final Assembly Line (FAL) operations and be spoken into a microphone connected to a computer.

In the following step, the vocal input message is converted S11 into a text input message. This is usually performed by a vocal-to-text converter, which is stored in a data storage of the computer.

Subsequently, the text input message is processed S12 using a neural network to identify the content of the text input message and extract a request about at least one item related to the production line. The neural network is configured as a large language model, LLM, and has been trained with a vast number of language samples. The LLM is thus able to perform natural language processing and to understand the application context within the content of the text input message and is able to understand the request of the worker. Furthermore, the neural network is trained with information about the items of the production line. The information about the item may relate to, for example, manuals about the item, an inventory of the item at the factory, where the production line is located, live info about the availability of the item, notes of other workers related to the item, and so on. In case the LLM does not understand the request of the worker, it might request the engineer to further specify his request.

The item may be a tool, an assembling part, a component of a product the production line is assembling, a production robot and a characteristic of the assembling line. The request thus may be an availability or a position of a tool, or an application of a machine of the production line or the like. The neural network is configured as a Generative Pretrained Transformer, GPT, or a generative artificial intelligence. These represent suitable algorithms for the task in that these neural networks can be trained with additional information about the production line.

Then, a response message containing information about the item of the production line using the neural network is generated S13. The response message is formulated by the neural network using natural language processing based on the large language model of the neural network.

The response message is then converted S14 into a vocal response message. This can be done by a text-to-vocal interpreter. As a final step in this embodiment, the vocal response message is provided S15 to the. This can be performed by e.g., a loud speaker connected to the computer.

Figure 2:
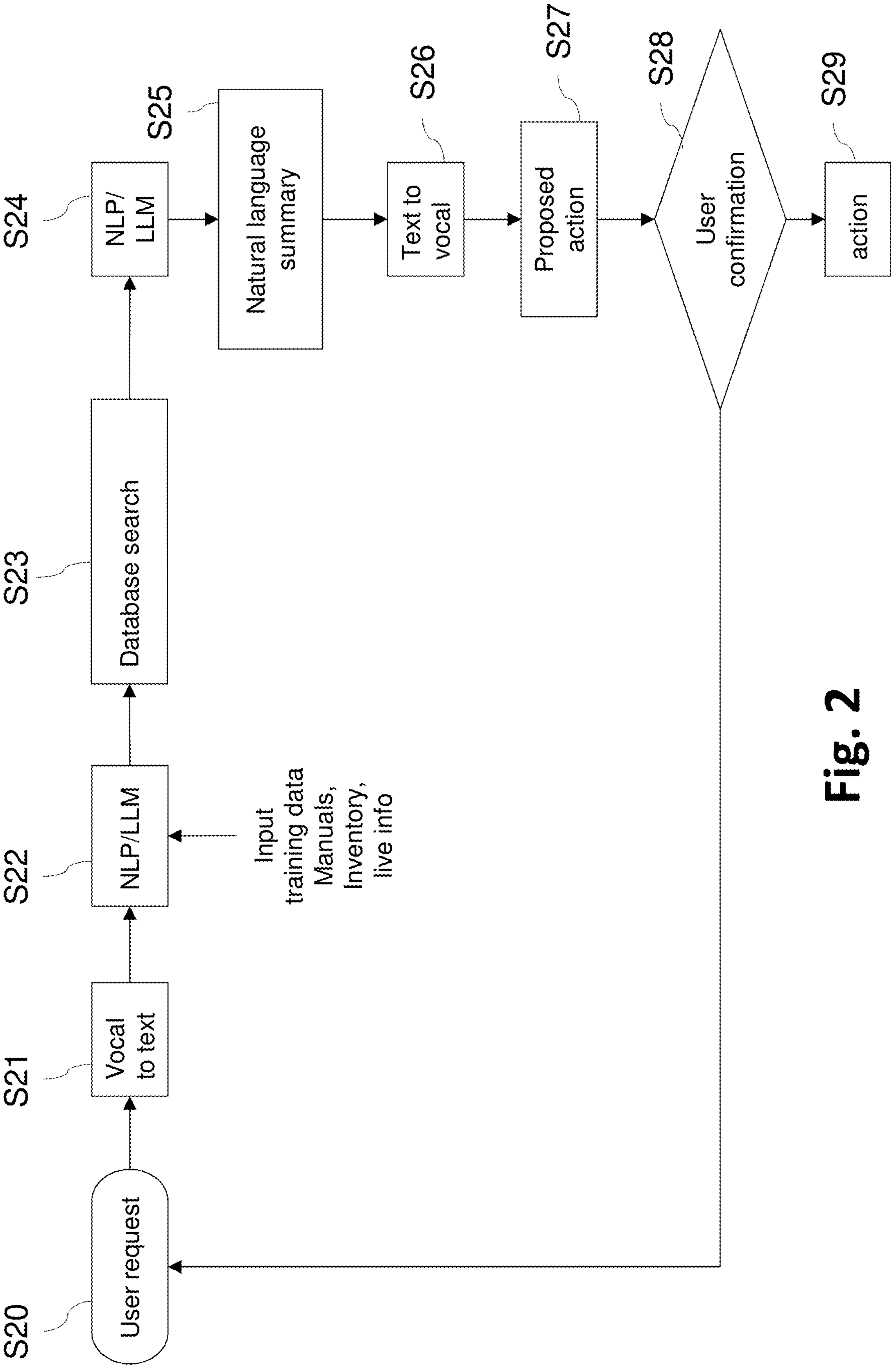
FIG. 2 shows a flow diagram of a method for assisting a worker in a production line according to a further embodiment of the invention.

FIG. 2 shows a flow diagram of a method for assisting a worker in a production line according to a further embodiment of the invention.

The method shown in FIG. 2 is based on the method as described previously with reference to FIG. 1. In this respect, steps S20 to S22 and S26 to S27 essentially correspond to steps S10 to S15 as described in the embodiment shown in FIG. 1. The embodiment of the method shown in FIG. 2 has some additional method steps, that will be described in the following.

After processing the input message in step S22, a database is accessed and searched S23 based on the extracted item to determine information related to the item, wherein the information includes at least a characteristic of the request about the at least one item. The characteristic of the item may thus be a position, a type, a handling of the tool or machine or the like. In this embodiment, the database includes a plurality of information sources, which includes at least one of a manual about an item of the production line, a note from another worker or an inspector, an inventory and a live status of the production line. The live status includes a current position of the items related to the production line. Information about e.g., the position of the tool the worker is interested in can thus be retrieved instantaneously through the live data contained in the database.

The embodiment of the method shown in FIG. 2 further contains the additional step of summarizing S25 a plurality of information found in the database to generate the response message. The database accesses a plurality of information sources to retrieve or collect information. The relevant pieces of information have to be summarized to generate an instantly understandable response message for the worker. This is performed in step S25 by the neural network.

Furthermore, the embodiment of the method contains the additional step of receiving S28 a confirmation message of the worker based on the vocal response from the worker as user prompt or user request. The confirmation message may be input as a vocal message and converted by the vocal-to-text converter to text, which can be analyzed by the neural network.

The confirmation message is then evaluated for a level of required modification of the response message. If the level of required modification exceeds a predetermined value, the database is again accessed and searched for additional information about the item based on the confirmation message. This user feedback provided in step S28 thus is applied again until the worker is satisfied with the response. The worker then performs S29 the next action in the production line, which may be obtaining a tool, correctly handling a machine etc.

In further embodiments, the method may comprise an additional step, in which implicit content from the text input message using the neural network is extracted. The implicit content is then supplied or added to the content of the text input message before extracting a request about at least one item related to the production line. The implicit content may relate to a characteristic or a parameter of the item, which is required to solve the request. In this way, information missing in the vocal input message of the worker may be complemented for a useful search in the database.

Figure 3:
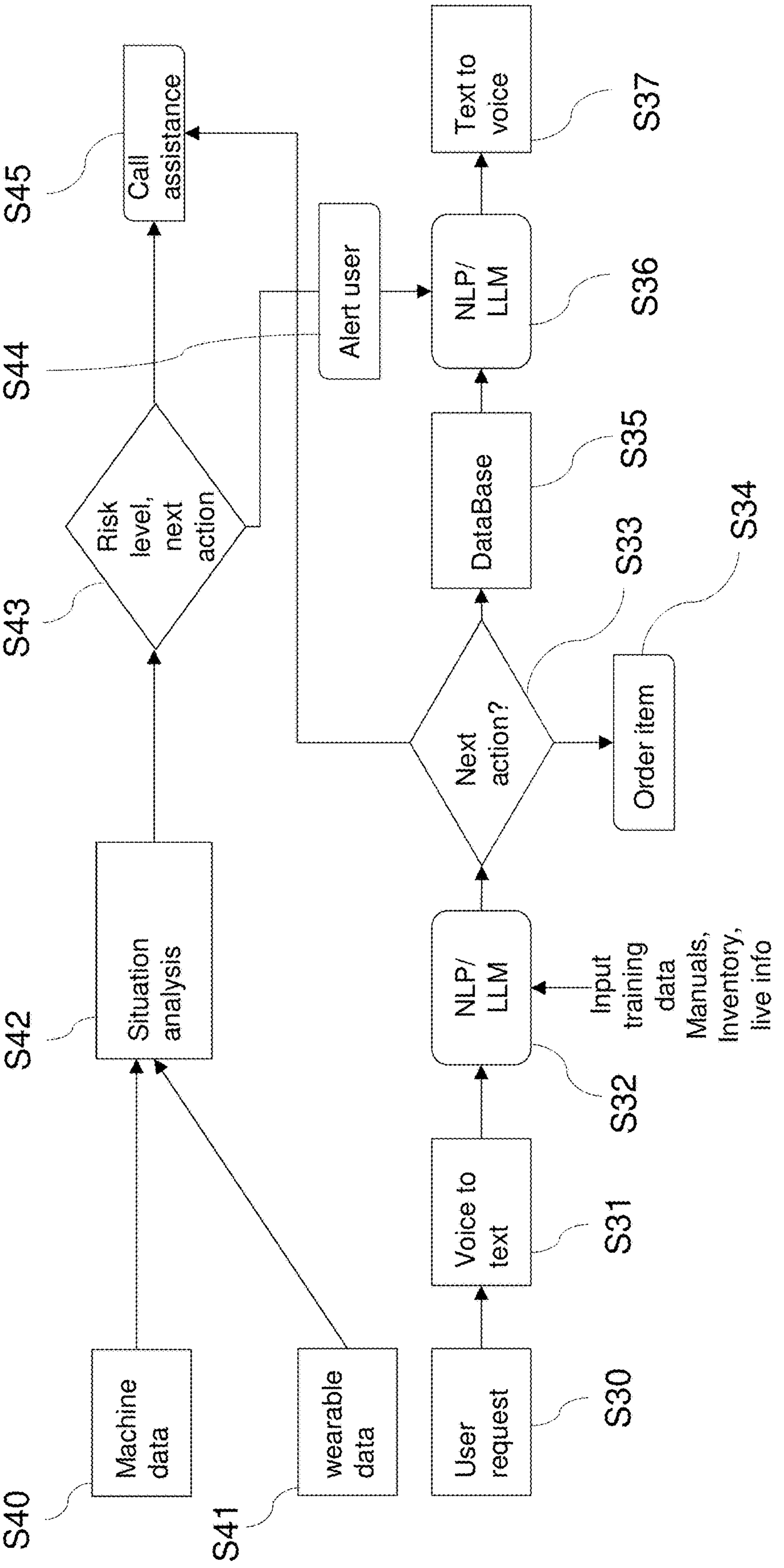
FIG. 3 shows a flow diagram of a method for assisting a worker in a production line according to a further embodiment of the invention.

FIG. 3 shows a flow diagram of a method for assisting a worker in a production line according to a further embodiment of the invention.

The method shown in FIG. 3 is based on the method as described previously with reference to FIG. 2. In this respect, steps S30 to S32 and S35 to S37 essentially correspond to steps S20 to S24 and S26 as described in the previous embodiment, whereas the equivalent method step to step S27, providing the worker with the vocal response, is not shown for better legibility. Although equivalents to steps S25, S28 and S29 are not shown in FIG. 3, these steps may also be integrated into the embodiment of FIG. 3. The embodiment of the method shown in FIG. 3 has some additional method steps, which will be described in the following.

Furthermore, step S32 is modified from step S12 in so far, that the neural network in this embodiment comprises more information about the production line. In particular, the neural network is trained with live information, so that it can evaluate, whether an item is available or not. In the following step S33, it is evaluated, whether the request can be solved without external help. In case, an item or a component related to the production line is not available and must be ordered, an additional step of ordering S34 the item is included in the method.

In addition, environmental data of the production line are retrieved S40 to determine a current situation of the production line, which includes machine data, or a status of the production line accessing a central control of the production line and so on. The environmental data are also retrieved by accessing S41 wearables of the worker such as a headset or smart glasses. In the following, a “situation analysis” is performed in that the database is accessed and searched S42 based on the extracted item to determine information related to the item based on the retrieved environmental data.

The method further comprises the step of determining S43 a risk level of the current situation by accessing the database and processing the environmental data.

If the risk level is above a predetermined value, an alert message is added S44 to the response message in order to warn the worker about a certain risk. Preferably, the neural network is configured to send an alert message independent of the request of the worker, thus even without any request from the worker, in case the risk is high enough. In other words, the neural network is configured to send an alert message in case the risk level is above e.g. the predetermined value or another predetermined threshold. Furthermore, if the risk level is above the same or a different, high predetermined value, a message is sent S45 to an assistant terminal to call for external help.

In further embodiments, an additional step of analyzing the vocal input message for determining a stress level of the worker using the neural network may be provided. The response message is then generated based on the determined stress level of the worker. Depending on the stress level, the response message can be set into a suitable “sentimental” context. In this embodiment, the response message may be short in case of a high stress level, because it is hard for the worker to concentrate on a longer response message in the actual state of the work at the production line. In a state of low stress, in which the worker can concentrate longer on the response message, the response message contains more detailed information.

In further embodiments, the method also includes extracting an implicit content such as a request from the text input message using the neural network. It follows supplying the implicit content to the content of the text input message before accessing and searching the database for extracting a request about at least one item related to the production line to determine a response to the input message. These steps provide a means for setting the content of the text input message into a correct context using information the worker has not explicitly expressed. In further embodiments, the neural network may also include accessing the database for collecting additional information with respect to a particular situation or status of the worker at the production line. In some of these embodiments, the step of determining the stress level may be based on the implicit request extracted from the text input message.

In further embodiments, in addition to a vocal response message, the neural network could reply to user requests by sending images to smart glasses of the worker.

Figure 4:
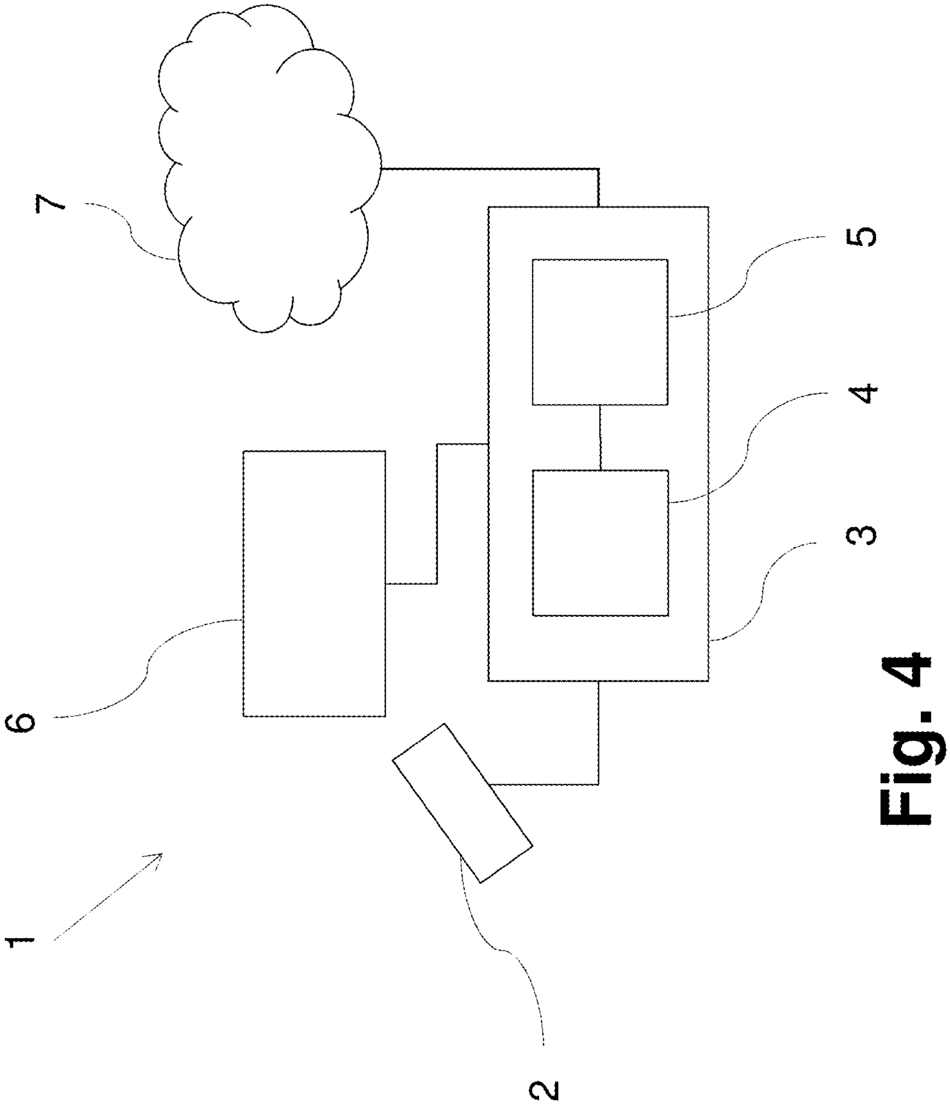
FIG. 4 shows a data processing apparatus according to an embodiment of the invention.

FIG. 4 shows a data processing apparatus according to an embodiment of the invention.

FIG. 4 shows data processing apparatus 1. The data processing apparatus 1 comprises an input terminal 2, which is configured as a microphone, by which the vocal input message can be received from the worker. The data processing apparatus 1 comprises a speaker 6 through which the vocal response message is provided to the worker. The data processing apparatus 1 comprises a computer housing 3, which includes a data storage 5 and a processor 4. The processor 4 is configured to perform the method as described above with reference to FIGS. 1 to 3. Using the data storage 5. The data storage 5 comprises program code for the neural network as described above with reference to FIGS. 1 to 3. The data storage 5 thus contains a computer program comprising instructions, which, when the program is executed by a computer, causes the computer to carry out the method as described above with reference to FIGS. 1 to 3. In further embodiments, the data storage 5 comprises the database for accessing further information about the production line. In further embodiments, the data storage 5 and/or the processor 4 are connected to a cloud 7 for accessing information from other sources, e.g., components or further sensors of the production line, to obtain live info of the production line.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 data processing apparatus
2 input terminal
3 computer housing
4 processor
5 data storage
6 speaker
7 cloud
S10-S15 method steps
S20-S29 method steps
S30-S37 method steps
S40-S45 method steps

The invention claimed is:

1. A method for assisting a worker in a production line, comprising:

receiving a vocal input message from a worker;

converting the vocal input message into a text input message;

processing the text input message using a neural network to identify a content of the text input message and extract a request about at least one item related to the production line, wherein the neural network is configured as a large language model, LLM, and trained with information about items of the production line;

determining whether the at least one item is available for use on the production line;

generating a response message containing information about the at least one item of the production line using the neural network;

converting the response message into a vocal response message;

providing the vocal response message to the worker; and ordering, when it is determined that the at least one item is not available for use on the production line, the at least one item automatically, wherein the neural network is configured as a Generative Pretrained Transformer, GPT, or a generative artificial intelligence.

2. The method according to claim 1, wherein the at least one item comprises at least one of a tool, an assembling part, a component of a product which is assembled in the production line, a production robot, and a characteristic of the production line, and wherein the information about the at least one item includes at least one of a manual of the at least one item, an inventory of the at least one item, live information about the at least one item or spare parts.

3. The method according to claim 1, further comprising accessing and searching a database based on the extracted item to determine information related to the at least one item, wherein the information includes at least a characteristic of the at least one item.

4. The method according to claim 3, wherein the database includes a plurality of information sources, which includes at least one of at least one manual about an item of the production line, an inventory and a live status of the production line, wherein the live status includes a current position of the at least one item related to the production line.

5. The method according to claim 3, wherein generating the response message comprises summarizing a plurality of information found in a database.

6. The method according to claim 1, further comprising:

receiving a confirmation message from the worker based on the vocal response;

evaluating the confirmation message for a level of required modification of the response message, and when the level of required modification exceeds a predetermined value, accessing and searching a database based on the confirmation message to determine further information related to the at least one item.

7. The method according to claim 1, further comprising:

retrieving environmental data of the production line to determine a current situation, and accessing and searching a database based on the extracted item to determine information related to the at least one item based on the retrieved environmental data.

8. The method according to claim 7, further comprising determining a risk level of the current situation based on the environmental data.

9. The method according to claim 8, further comprising:

adding an alert message to the response message, when the risk level is above a predetermined value.

10. The method according to claim 8, further comprising:

sending, automatically, a message to an assistant terminal disconnected from the worker to call for external help, when the risk level is above a predetermined value, and wherein the neural network preferably is configured to send an alert message independent of the request from the worker, when the risk level is above the predetermined value.

11. The method according to claim 7, wherein retrieving the environmental data includes accessing wearables of the worker, in particular at least one of a headset and smart glasses of the worker.

12. The method according to claim 1, further comprising:

analyzing the vocal input message for determining a stress level of the worker using the neural network, wherein generating the response message is performed based on the determined stress level of the worker.

13. A data processing apparatus comprising:

an input device, a data storage, and a processor configured to perform the method according to claim 1.

14. A non-transitory computer readable medium storing a computer program comprising instructions, which, when the program is executed by a processor of a computer, cause the computer to carry out the method of claim 1.

* * * * *